Feb. 9, 1932.   M. M. KENNEDY   1,844,126
THERMOSTATICALLY CONTROLLED GAS VALVE
Filed Jan. 21, 1931
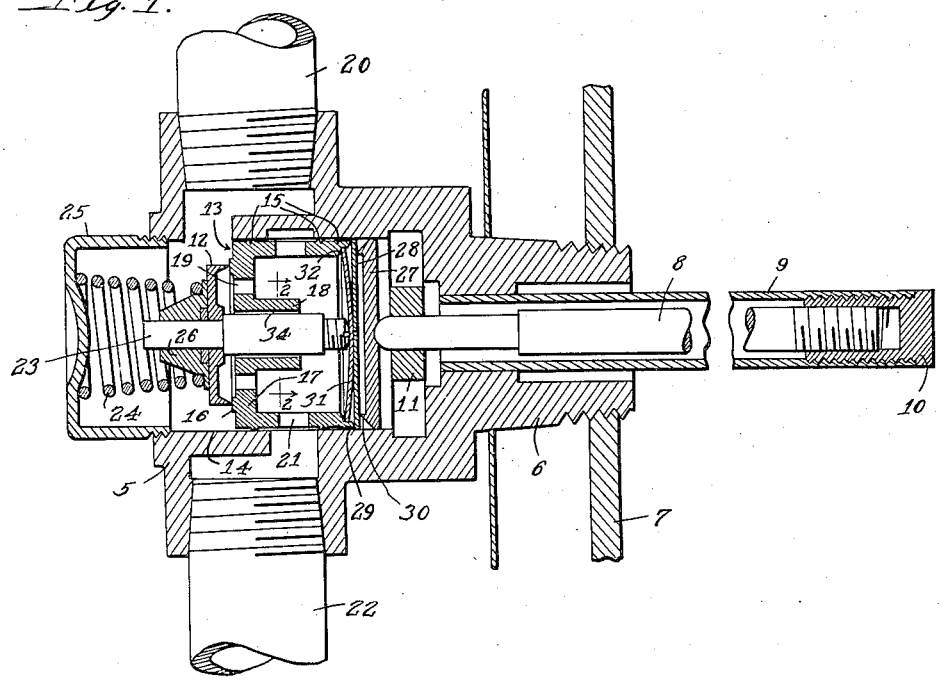
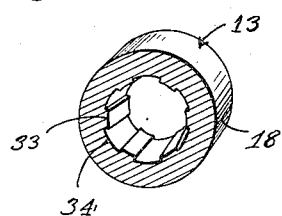
Inventor:
Martin M. Kennedy
By Wilson, Dowell,
McCanna & Rehm Attys.

Patented Feb. 9, 1932

1,844,126

UNITED STATES PATENT OFFICE

MARTIN M. KENNEDY, OF LYNWOOD, CALIFORNIA, ASSIGNOR TO GRAYSON HEAT CONTROL, INC., OF LYNWOOD, CALIFORNIA, A CORPORATION OF CALIFORNIA

THERMOSTATICALLY CONTROLLED GAS VALVE

Application filed January 21, 1931. Serial No. 510,071.

This invention relates to thermostatic devices generally, but is principally concerned with thermostatically controlled gas valves adapted for use with water heaters, oven regulators, and other gas appliances.

The principal object of my invention is to provide a valve of this kind which is so constructed that the valve operates more easily than was heretofore the case, and is certain to close even under the light spring pressure which has to be relied upon in such valves, and there is no likelihood of its sticking.

The invention is illustrated in the accompanying drawings, in which—

Figure 1 is a central longitudinal section through a valve embodying my improvement, and Fig. 2 is a sectional detail in perspective of the valve stem guide, the same being taken in the plane of the line 2—2 of Figure 1, looking in the direction of the arrows.

The valve herein shown follows the disclosure of Grayson Patent No. 1,781,328, issued November 11, 1930, but it will soon appear that the invention is not limited to use in this or any other specific form of valve. The valve casing 5 has an integral extension 6 arranged to thread in a hole in the side wall of the tank 7 of a hot water heater so that the thermostat, consisting of the inner rod element 8 and outer tubular element 9, projects into the tank so as to be subjected to the heat of the water therein. The rod 8 is preferably made of invar which is substantially free from expansion or contraction under temperature change, whereas the tube 9 is of copper or any other material having a relatively high coefficient of expansion. The rod 8 is mounted in the tube 9 in a plug 10 threaded in the end of the tube, and it is evident that expansion and contraction of the tube results in slight endwise movement of the rod. The rod is arranged to be adjusted relative to the tube in the well-known way by means of a lever 11 fixed on the rod and projecting from the side of the valve casing. The movement of the rod 8, being so slight, has to be amplified to communicate the proper amount of movement to the valve, which is shown at 12. The means for accomplishing this amplification naturally varies in form considerably in different valves, whether the valve be of the graduating type commonly used in oven regulators, or the snap-action type now commonly used in water heaters and other gas appliances. My invention, while adapted for use with either the graduating or snap-action type of valves, is herein illustrated as applied to the latter type.

In conformance with the Grayson patent, I have illustrated a bushing 13 to serve as a combination valve seat, valve stem guide, and valve actuator support. This bushing is preferably formed of rolled brass, as distinguished from the cast brass of which the casing itself is made. The bushing is, therefore, less subject to corrosion under the effects of the various gases commonly used for fuel. The bushing has a press fit in the bore 14 provided in the casing 5. The valve 12 is of the poppet type and arranged to engage a seat 16 provided on the outside of the transverse wall or web 17 of the bushing. The latter has the centrally bored boss 18 integral therewith serving as the valve stem guide and also has a circularly arranged series of ports 19 therein within the confines of the valve seat 16. Thus, when the valve 12 is opened, gas is arranged to flow from the supply pipe 20 through the ports 19 into the bushing 13, and thence through ports 21 provided in the wall of the bushing to the pipe 22 leading to the burner of the heater or other gas appliance. A valve stem 23 fits slidably in the guide 18, and has the valve 12 mounted on the reduced end portion thereof, as shown. A spring 24, received in a cap 25 closing the open end of the bore 14, bears against a collet 26 which fits on the reduced end of the stem 23 behind the valve 12, so that the valve is normally urged toward the seat. A plunger 27 fits slidably in the bore 14 on the opposite side of the bushing 13 from the valve 12, and has the rounded end of the rod 8 bearing against the back thereof at the center to communicate movement to the plunger toward the valve in the contraction of the tube 9. A pair of movement-amplifying levers 28, resting at their outer ends on an annular shoulder 29 provided on the bushing 13, are engaged near their outer ends by an annular shoulder 30 provided on the plunger 27. The inner ends of the levers bear against the center of a snap-over disc 31 made of spring material, such as spring bronze or the like. The disc 31 rests on another annular shoulder 32 provided on the bushing 13. As described in the Grayson patent, the movement of the plunger 27 results in amplified movement of the inner ends of the levers 28, and this amplified movement is transmitted to the center of the disc to move the same toward dead center. When the center of the disc is moved slightly past dead center, the disc snaps over by reason of its resilience, and abruptly opens the valve against the action of the spring 24. In the expansion of the tube 9, due to the heating of the water, the plunger 27 backs away from the levers 28 and disc 31, and at a certain point, the disc snaps back to its normal convexo-concave form, allowing the valve to close as abruptly as it was opened. The construction thus far described is in part covered in the Grayson patent mentioned above. In passing to the feature with which my invention is particularly concerned, attention is called to the circumferential burrs 15 provided on the periphery of the bushing. These burrs are formed by serrating the periphery of the bushing in any suitable way to extrude the metal just enough to serve the purpose of forming a gas-tight seal in the joint between the bushing and the bore in the valve casing. In that way it is not necessary to work to such close limits in the machining of the bore or outside diameter of the bushing, and still a good leak-proof joint is assured.

In this valve, as well as in other thermostatic valves of a similar type, the fact that the valve is opened by the thermostatic means against the action of the closing spring, necessitates use of a rather light spring. That is to say, the spring 24 has to be light enough so that it may be overcome by the spring tension of the disc 31 when it snaps over dead center, in order to allow the valve to be opened. This gives rise to the objection frequently that the valve fails to close when the valve stem does not work perfectly freely in its guide and sets up enough resistance to movement of the valve. The valve stem is, of course, directly in the path of the gas flowing through the valve casing when the valve is opened, and the foreign substances present in the gas are deposited on the stem and worked into the valve stem guide, so that while a valve stem may work perfectly freely when new, the gummy substance deposited thereon in service eventually places an appreciable drag on its movement, and sooner or later causes the stem to stick and keep the valve from closing. A heavier valve spring could, of course, overcome this difficulty, but, as stated before, there is the limitation to the use of a light valve spring because it must not set up appreciable resistance to the snap-action of the disc. The only way it has been possible to avoid this difficulty in the past was to take the valve apart every so often for a thorough cleaning, but the average user pays little or no attention to printed instructions and cannot be expected to be careful to clean the valve as often as there may be a need for it. The result is that valves require more servicing than can be tolerated for a practical and serviceable unit. In accordance with my invention, instead of simply providing the bore 33 in the valve stem guide 18 in the form of a plain reamed hole in which the valve stem 23 is arranged to fit accurately, which would mean the likelihood of trouble as soon as just a little foreign substance collected on the stem and got worked into the bore, I broach the bore so as to provide a plurality of circumferentially spaced grooves or cavities 34 to accommodate the foreign matter. In other words, I accomplish a two-fold purpose; the fact that the surface contact between the valve stem and guide is reduced without impairing the accuracy of the assembly reduces the frictional resistance to movement of the stem enough to overcome the trouble of sticking, and then, in addition, the cavities referred to provide a place into which the foreign matter is arranged to flow as it is rubbed off the stem in the closing of the valve. This broaching of the valve stem guide involves little or no additional cost, and means quite a saving in the expense of servicing, and, of course, the fact that a valve gives uninterrupted service over long periods without requiring attention of any kind is such an advantage that valves embodying the improvement are much preferred to those made the old way.

I claim:

1. In a thermostatically controlled valve comprising a valve casing having an inlet and outlet, a wall dividing the casing into an inlet chamber and outlet chamber communicating respectively with the aforesaid inlet and outlet, one or more ports in said wall to afford communication between said chambers, a valve in the inlet chamber arranged to seat on said wall to close off communication through said ports between said chambers, spring means tending normally to seat the valve, and thermostatic means for unseating the valve against the action of said spring means, a stem for said valve projecting through said wall whereby to provide connection between the valve and the thermostatic means, and a hole in said wall slidably receiving said stem, said hole being enlarged at a plurality of circumferentially spaced points to provide cavities therein about the valve stem for the accommodation of foreign matter rubbed off the valve stem, whereby to insure continuous easy sliding movement of the valve stem in said hole.

2. In a thermostatically controlled valve comprising a valve casing having an inlet and outlet, a wall dividing the casing into an inlet chamber and outlet chamber communicating respectively with the aforesaid inlet and outlet, one or more ports in said wall to afford communication between said chambers, a valve in the inlet chamber arranged to seat on said wall to close off communication through said ports between said chambers, and a spring in the inlet chamber tending normally to seat the valve, a valve stem extending from the valve through said wall, a thermostat, snap-action means operated by the latter for opening the valve against the action of the spring, and a hole provided in said wall to slidably receive the valve stem, said hole being enlarged at a plurality of circumferentially spaced points to provide cavities therein about the valve stem for the accommodation of foreign matter rubbed off the valve stem, whereby to insure continuous easy sliding movement of the valve stem in said hole.

3. In a gas valve or the like, the combination in a valve casing having inlet and outlet chambers separated by a partition wall, the combination with a valve in the inlet chamber arranged to seat on said wall to close off communication between said chambers through one or more ports in said wall, spring means normally tending to seat the valve, and means arranged to be operated automatically to unseat the valve against the action of the spring means, of a valve stem extending from the valve through said wall, and a hole in said wall serving as a valve stem guide having the valve slidably received therein, said hole being enlarged at a plurality of circumferentially spaced points to provide cavities therein about the valve stem for the accommodation of foreign matter rubbed off the valve stem, whereby to insure continuous easy sliding movement of the valve stem in said hole.

4. In a gas valve or the like, the combination with a poppet valve, spring means normally tending to move the valve in one direction, and means arranged to be automatically or otherwise operated to move the valve in the opposite direction against the action of the spring means, of a stem for said valve, and a valve stem guide having the stem fitting closely therein for sliding movement, said guide having one or more cavities therein about the valve stem for the accommodation of foreign matter rubbed off the stem, whereby to prevent such matter from interfering with the easy sliding movement of the stem in the guide.

5. In a gas valve or the like, the combination with a poppet valve, spring means normally tending to move the valve in one direction, and means arranged to be automatically or otherwise operated to move the valve in the opposite direction against the action of the spring means, of a stem for said valve, and a valve stem guide having the stem fitting closely therein for sliding movement, said guide having one or more grooves provided therein about the valve stem arranged to receive foreign matter rubbed off the valve stem whereby to insure continuous easy sliding movement of said stem.

6. In a gas valve or the like, the combination with a poppet valve, spring means normally tending to move the valve in one direction, and means arranged to be automatically or otherwise operated to move the valve in the opposite direction against the action of the spring means, of a stem for said valve, and a valve stem guide having the stem fitting closely therein for sliding movement, said guide having one or more longitudinal grooves provided therein about the valve stem arranged to receive foreign matter rubbed off the valve stem whereby to insure continuous easy sliding movement of said stem.

7. In a gas valve or the like, the combination with a poppet valve, spring means normally tending to move the valve in one direction, and means arranged to be automatically or otherwise operated to move the valve in the opposite direction against the action of the spring means, of a stem for said valve, and a valve stem guide having the stem fitting closely in a bore provided therein for sliding movement, the said stem and guide elements being conformed in the bore so as to provide one or more cavities therein for the accommodation of foreign matter rubbed off the stem, whereby to prevent such matter from interfering with the easy sliding movement of the stem in the guide.

8. In a gas valve or the like, the combination with a poppet valve, spring means normally tending to move the valve in one direction, and means arranged to be automatically or otherwise operated to move the valve in the opposite direction against the action of the spring means, of a stem for said valve, and a valve stem guide, the said guide element having a bore therein closely receiving the stem element for sliding movement, and the one element being conformed in the bore so as to provide one or more grooves communicating with the sliding joint between said elements whereby to collect foreign matter therein rubbed off the stem in the bore and insure continuous easy sliding movement of the stem.

9. The combination with a valve adapted to control the flow of a fluid through a port, of a valve stem, and a guide therefor having a bore therein, said stem being received in said bore with a close working fit whereby the elements are arranged to have movement relative to one another, the said interfitting elements being conformed in the bore so as to provide one or more small cavities therein solely for the accommodation of foreign matter rubbed off said stem whereby to prevent the same from interfering with the easy movement of the elements relative to each other.

In witness of the foregoing I affix my signature.

MARTIN M. KENNEDY.